(12) United States Patent
Huang

(10) Patent No.: US 8,740,483 B2
(45) Date of Patent: Jun. 3, 2014

(54) PRINTER WITH ADJUSTING APPARATUS

(75) Inventor: Szu-Hai Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 320 days.

(21) Appl. No.: 13/217,508

(22) Filed: Aug. 25, 2011

(65) Prior Publication Data

US 2012/0251217 A1    Oct. 4, 2012

(30) Foreign Application Priority Data

Apr. 1, 2011    (TW) .............................. 100111473 A

(51) Int. Cl.
B41J 19/56    (2006.01)

(52) U.S. Cl.
USPC ................ 400/335; 400/319; 400/320; 347/8

(58) Field of Classification Search
USPC ................ 400/335, 59, 320, 319, 328.1, 323; 347/8
See application file for complete search history.

(56) References Cited

U.S. PATENT DOCUMENTS 6,575,543 B2 * 6/2003 Ahn ................................. 347/8

FOREIGN PATENT DOCUMENTS

JP    58205785 A   * 11/1983

* cited by examiner

Primary Examiner — Matthew G Marini
(74) Attorney, Agent, or Firm — Novak Druce Connolly Bove + Quigg LLP

(57) ABSTRACT

An adjusting apparatus includes a shaft, a rack, and a gear. The shaft includes a cam portion contacting a bracket and a securing portion. The cam portion includes a first outer edge and a second outer edge connected to the first outer edge. The cam portion defines a pivoting axis. The distance between the first outer edge and the pivoting axis is less than the distance between the second outer edge and the pivoting axis. The gear is toothed and secured to the shaft and the rack defines a plurality of slots engaged by the toothed gear. The rack is used to drive the gear and the shaft to be rotated.

10 Claims, 6 Drawing Sheets

PRINTER WITH ADJUSTING APPARATUS

BACKGROUND

1. Technical Field

The disclosure generally relates to printers, especially, to a printer with a print-adjusting apparatus.

2. Description of Related Art

There is a certain distance between a print head of a printer and a print platform of the printer. The distance can be adjusted by an adjusting apparatus. A traditional adjusting apparatus takes up a great deal of room in the printer.

Thus, there is room for improvement within the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
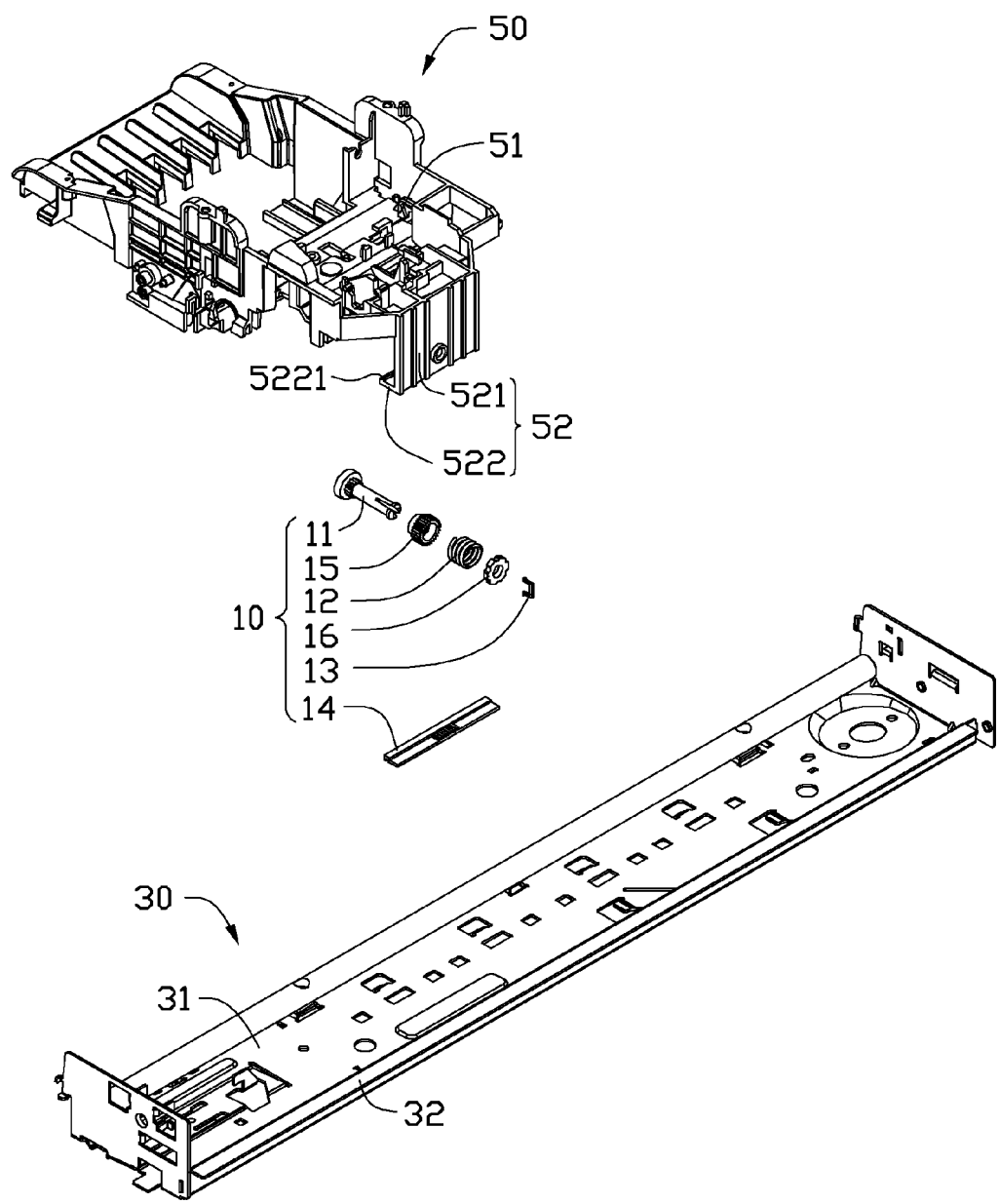
FIG. 1 is an exploded, isometric view of an embodiment of a printer, the printer including an adjusting apparatus and a rack.
Figure 2:
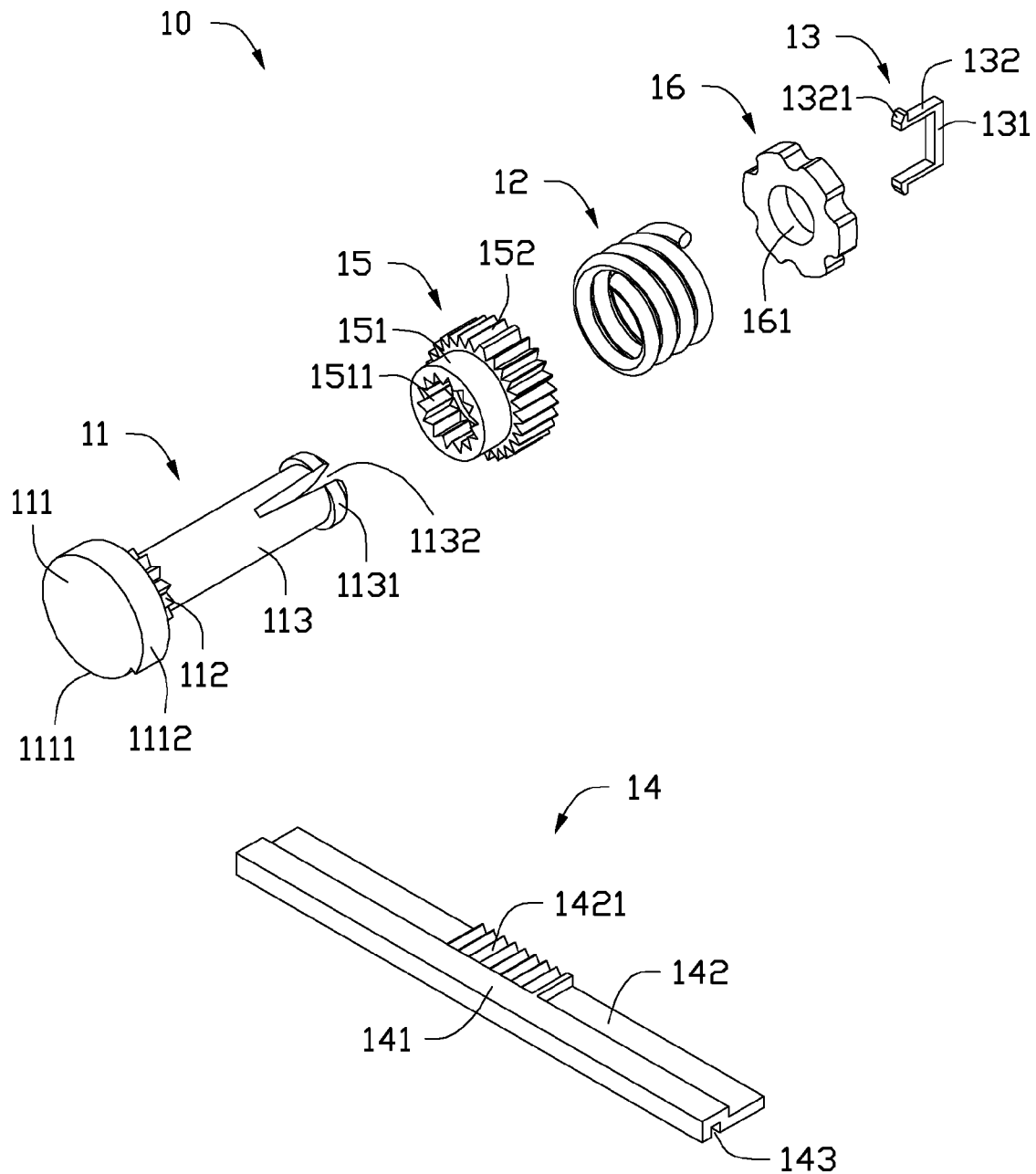
FIG. 2 is an exploded, isometric view of the adjusting apparatus of FIG. 1.
Figure 3:
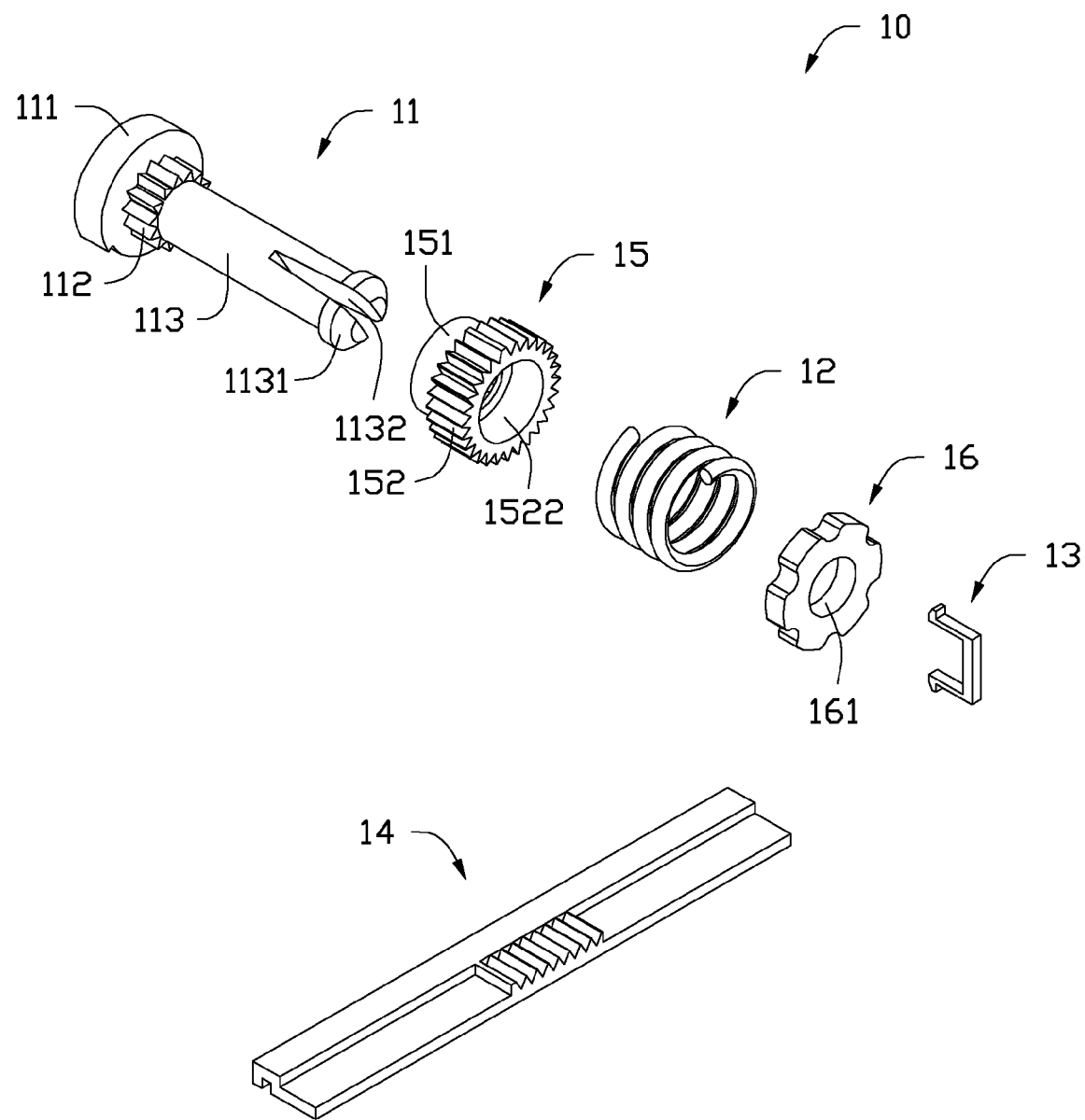
FIG. 3 is similar to FIG. 2, but viewed from another aspect.
Figure 4:
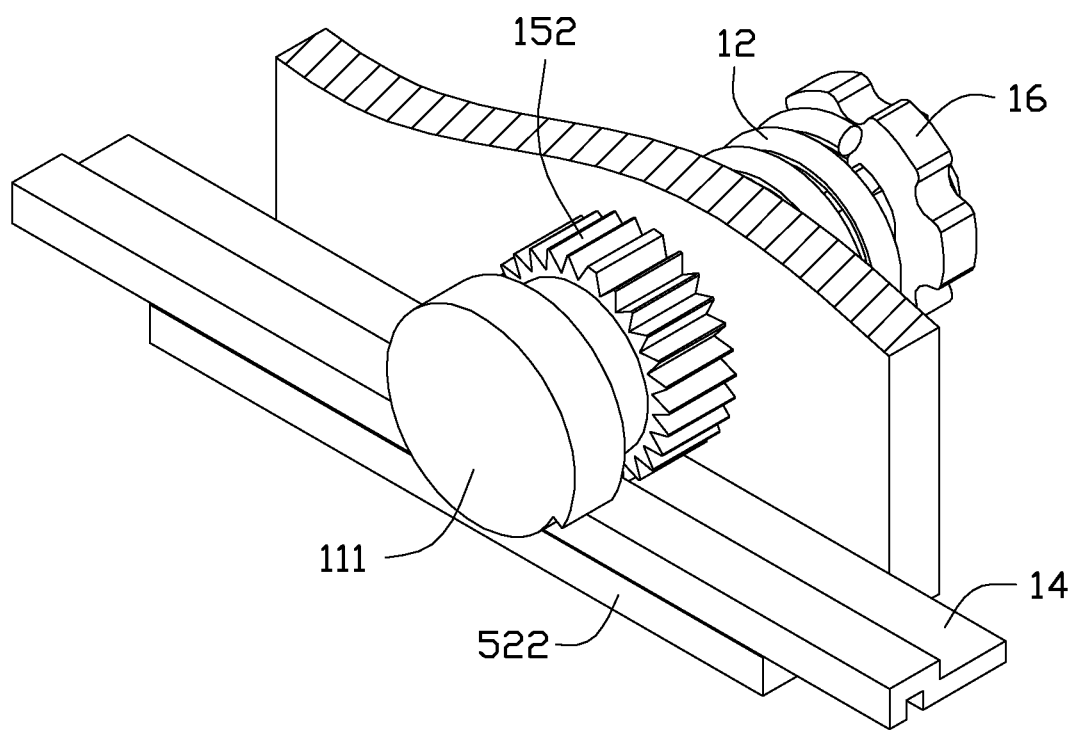
FIG. 4 is a view of the adjusting apparatus of FIG. 1 assembled.
Figure 5:
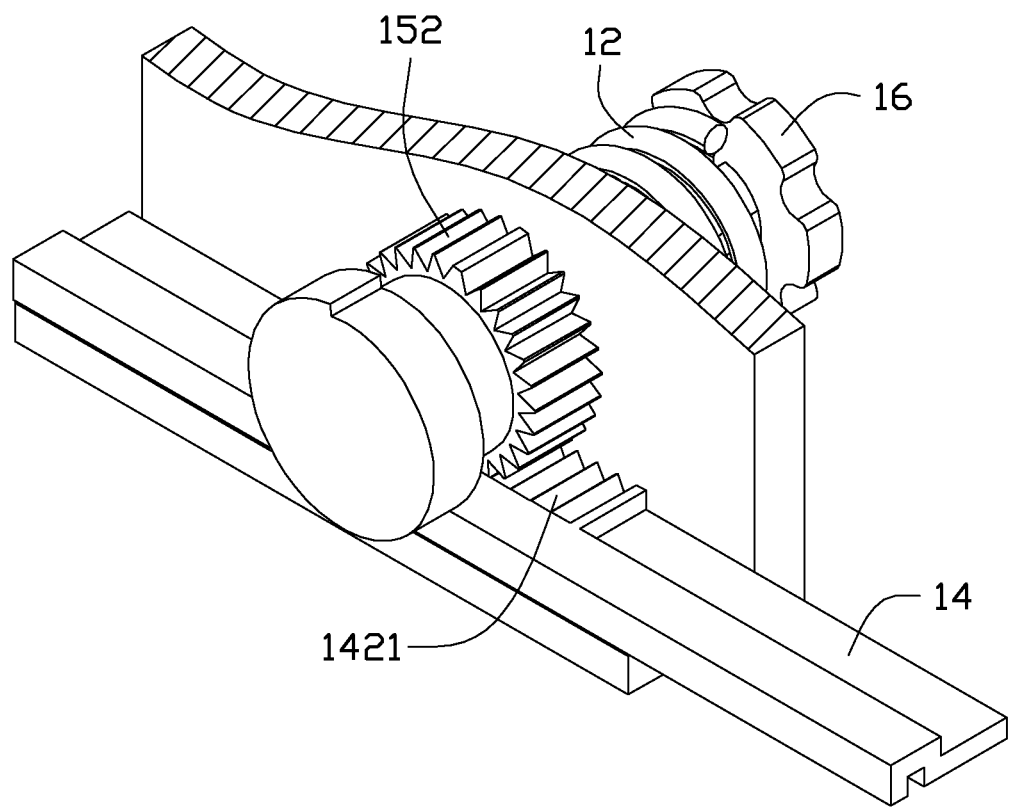
FIG. 5 is similar to FIG. 4, with the rack moved.
Figure 6:
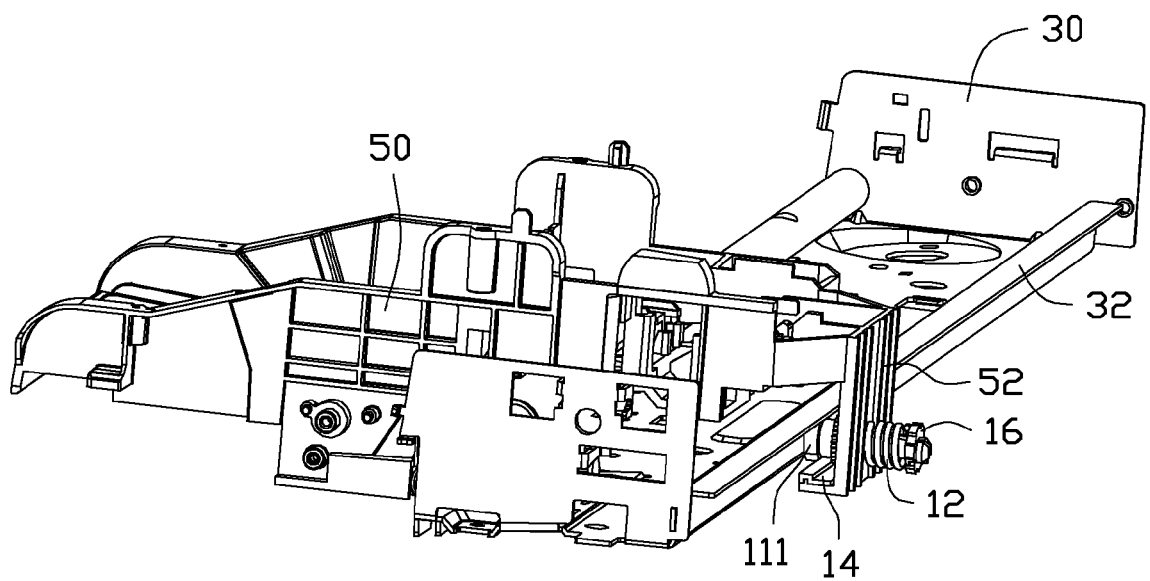
FIG. 6 is an assembled, isometric view of the printer of FIG. 1.

Referring to FIG. 1, a printer in one embodiment is shown. The printer includes a bracket 30, a base 50, and an adjusting apparatus 10 mounted to the base 50. A printing head (not shown) is also mounted on the base 50.

The adjusting apparatus 10 includes a shaft 11, an elastic element 12, a securing element 13, a rack 14, a gear 15, and a grommet 16.

The shaft 11 includes a cam portion 111, a securing portion 112 extending from the cam portion 111, and a shank portion 113 extending from the securing portion 112. The shank portion 113 includes a stopper portion 1131. A cutout 1132 is defined in the stopper portion 1131 to divide the stopper portion 1131 into two parts. The cam portion 111 includes a first outer edge 1111 and a second outer edge 1112 connected to the first outer edge 1111. The first outer edge 1111 and the second outer edge 1112 are arc-shaped. The cam portion 111 defines a pivoting axis. The distance between the first outer edge 1111 and the pivoting axis is less than the distance between the second outer edge 1112 and the pivoting axis. In one embodiment, the elastic element 12 is a coil spring. The securing portion 112 has a plurality of outer teeth. The securing element 13 is U-shaped. The securing element 13 includes a connecting portion 131 and two fixing portions 132 extending from opposite sides of the connecting portion 131. Each fixing portion 132 includes a hook portion 1321.

The rack 14 includes a support portion 141 and a mounting portion 142. The mounting portion 142 defines a plurality of lateral slots 1421 to engage with the gear 15. Each lateral slot 1421 is triangular. The rack 14 further defines a positioning slot 143. The positioning slot 143 runs the length of the rack 14. The gear 15 includes an engaging portion 151 and a gear portion 152 extending from the engaging portion 151. The gear portion 152 and the engaging portion 151 have substantially the same axis. The outer diameter of the gear portion 152 is greater than the outer diameter of the engaging portion 151. The gear portion 152 includes a plurality of outer teeth corresponding to the lateral slots 1421 of the mounting portion 142. A mounting opening 1522 is defined in the center of the gear portion 152. The engaging portion 151 defines a securing opening 1511 corresponding to the securing portion 112. The securing opening 1151 communicates with the mounting opening 1522. A securing hole 161 is defined in the grommet 16. The securing hole 161 corresponds to the stopper portion 1131.

The bracket 30 includes a bracket body 31 and a sliding panel 32 extending from the bracket body 31. The base 50 includes a base body 51 and an extending portion 52 connected to the base body 51. The printing head and the extending portion 52 are disposed on opposite sides of a teeter-totter pivot (not shown). When the extending portion 52 moves down, the printing head ascends. The extending portion 52 is L-shaped. The extending portion 52 includes a connecting panel 521 extending from the base body 51 and a support portion 522 extending perpendicularly from the connecting panel 521. A through hole 5211 is defined in the connecting panel 521. The support portion 522 includes a positioning protrusion 5221. The positioning protrusion 5221 is bar-shaped.

Referring to FIGS. 1 to 6, in assembly of the adjusting apparatus 10 to the base 50, the positioning slot 143 of the rack 14 receives the positioning protrusion 5221 of the base 50 to enable the rack 14 to be slidably mounted on the base 50. The shank portion 113 of the shaft 11 extends through the securing opening 1511 and the mounting opening 1522 to enable the securing portion 112 to engage the securing opening 1511. The shank portion 113 extends through the through hole 5211 of the base 50. At this time, the gear portion 152 engages the teeth slot 1421 of the rack 14. The engaging portion 151 is placed on the support portion 141 of the rack 14. The elastic element 12 is coiled around the shank portion 113 and sandwiched between the gear 15 and the stopper portion 1131. The fixing portions 132 of the securing element 13 are pressed together. The fixing portions 132 extend though the grommet 16 and the cutout 1132. The fixing portions 132 engage with the grommet 16 when the fixing portions 132 are not under tension.

In assembly of the bracket 30 to the base 50, the sliding panel 32 of the bracket 30 abuts the cam portion 111. The rack 14 rotates the shaft 11 when the base 50 moves. The distance between the bracket 30 and the base 50 is dependent on whether it is the first or the second of the outer edges 1111 and 1112 (or an intermediate edge in between the two) which is in contact with the support portion 141, and it is that variable distance which governs the position of the printing head. The grommet 16 is pressed towards the extending portion 52 of the base 50 to enable the elastic element 12 to be compressed. The securing portion 112 of the shaft 11 may be pulled back to disengage the securing opening 1511 of the gear 15, rotated and released into a different position, which adjusts the distance between the base 50 and the bracket 30 manually.

Although numerous characteristics and advantages have been set forth in the foregoing description of the embodiments, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An adjusting apparatus for a device having a bracket, comprising:
   a shaft comprising a securing portion, a shank portion, and a cam portion adapted to contact the bracket, the cam portion comprising a first outer edge and a second outer edge connected to the first outer edge, the cam portion defining a pivoting axis, the securing portion extending from the cam portion and the shank portion extending from the securing portion to enable the securing portion to be located between the cam portion and the shank portion along the pivoting axis, wherein a distance between the first outer edge and the pivoting axis is less than a distance between the second outer edge and the pivoting axis;
   a gear passed through by the shaft portion to be secured to the securing portion, and comprising a plurality of teeth;
   a rack comprising a plurality of lateral slots engaging with the plurality of teeth, wherein the rack drives the gear and the shaft to be rotated;
   a grommet, a securing hole is defined in the grommet; and
   a securing element, the securing element comprising a connecting portion and two fixing portions extending from opposite sides of the connecting portion;
   wherein the shaft comprises a securing portion, and a securing opening is defined in a center of the gear engaging the securing portion; the securing portion is extended in and engages with the securing opening in a direction substantially perpendicular to a rotating direction of the gear; the shank portion comprises a stopper portion at a free end of the shank portion, and the elastic element is coiled around the shank portion between the stopper portion and the securing portion; a cutout is defined in the stopper portion to divide the stopper portion into two parts; the securing hole engages the stopper portion; and the two fixing portions are received in the cutout to engage with the grommet.

2. The adjusting apparatus of claim 1, wherein each fixing portion comprises a hook portion engaging with the grommet.

3. The adjusting apparatus of claim 1, wherein the securing element is U-shaped.

4. A printer comprising:
   a base;
   a bracket;
   a shaft mounted to the base, and comprising a securing portion and a cam portion contacting the bracket, the cam portion comprising a first outer edge and a second outer edge connected to the first outer edge, the cam portion defining a pivoting axis, wherein a distance between the first outer edge and the pivoting axis is less than a distance between the second outer edge and the pivoting axis;
   a gear secured to the shaft, and comprising a plurality of teeth;
   a rack slidably mounted on the base, and defining a plurality of lateral slots engaging the plurality of teeth; and
   an elastic element;
   wherein the rack slides relative to the base to drive the gear and the cam portion to be rotated, thereby changing a distance between the bracket and the base due to a switchable contact on the bracket between the first outer edge and the second outer edge; the shaft comprises a securing portion, and a securing opening is defined in a center portion of the gear engaging the securing portion; the securing portion is extended into and engages the securing opening in a direction substantially perpendicular to a rotating direction of the gear; the shaft further comprises a shank portion extending from the securing portion, the base includes an extending portion, and a through hole is defined in the extending portion; the shank portion is extendable through the through hole; the shank portion comprises a stopper portion at a free end of the shank portion, and the elastic element is coiled around the shank portion and placed between the stopper portion and the extending portion; and the securing portion and the stopper portion are disposed on opposite sides of the extending portion.

5. The printer of claim 4, further comprising a grommet, wherein a securing hole is defined in the grommet; a cutout is defined in the stopper portion to divide the stopper portion into two parts; and the securing hole engages the stopper portion.

6. The printer of claim 5, further comprising a securing element, wherein the securing element comprises a connecting portion and two fixing portions extending from opposite sides of the connecting portion, and the two fixing portions are received in the cutout to engage with the grommet.

7. The printer of claim 6, wherein each fixing portion comprises a hook portion engaging with the grommet.

8. The printer of claim 6, wherein the securing element is U-shaped.

9. The printer of claim 4, wherein the rack defines a positioning slot and the base comprises a positioning protrusion received in the positioning slot, and the rack slides relative to the base along the positioning protrusion.

10. The printer of claim 9, wherein the extending portion is L-shaped.

* * * * *